Figure 6:
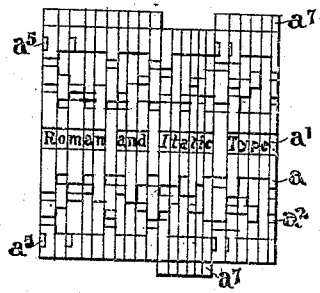

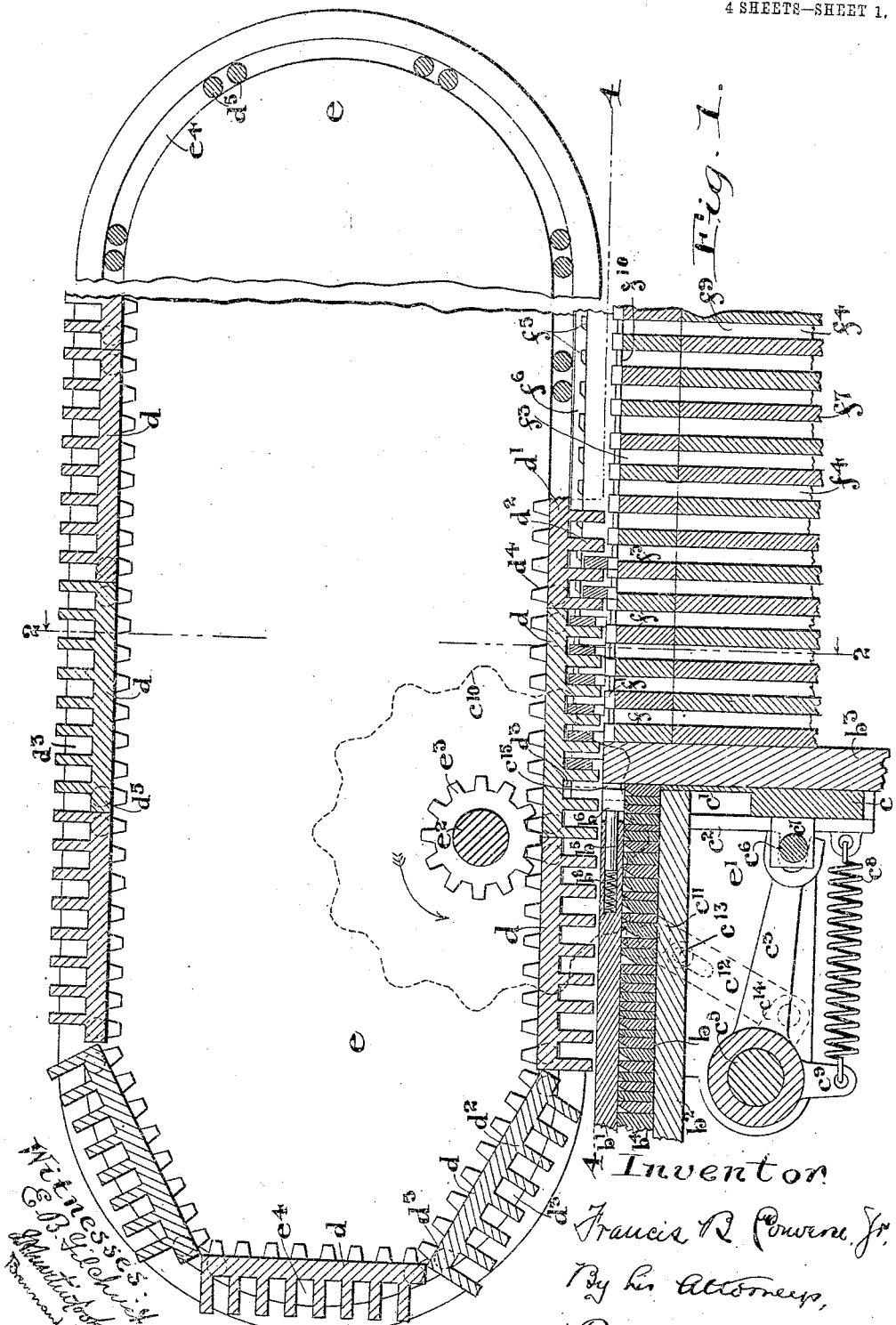

No. 890,266. PATENTED JUNE 9, 1908.
F. B. CONVERSE, Jr.
MATRIX ASSEMBLING AND DISTRIBUTING MACHINE.
APPLICATION FILED SEPT. 17, 1906.
4 SHEETS—SHEET 2.
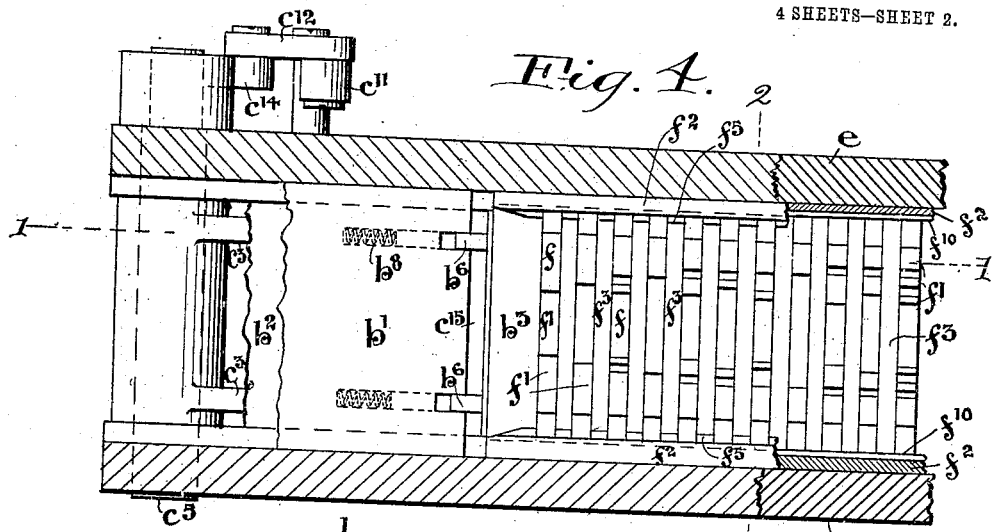
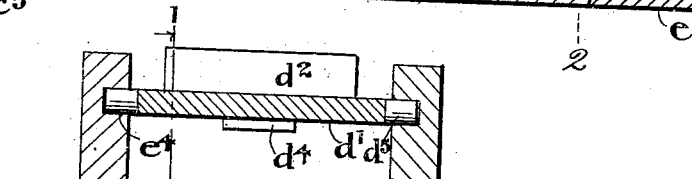
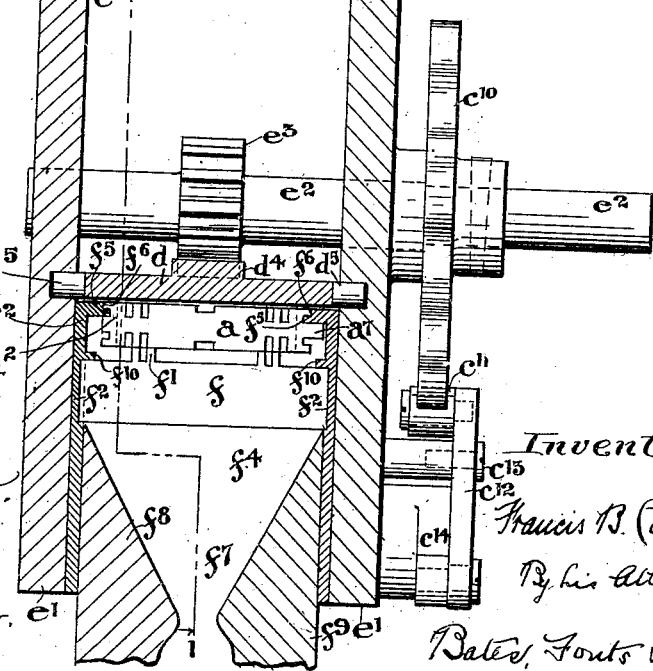

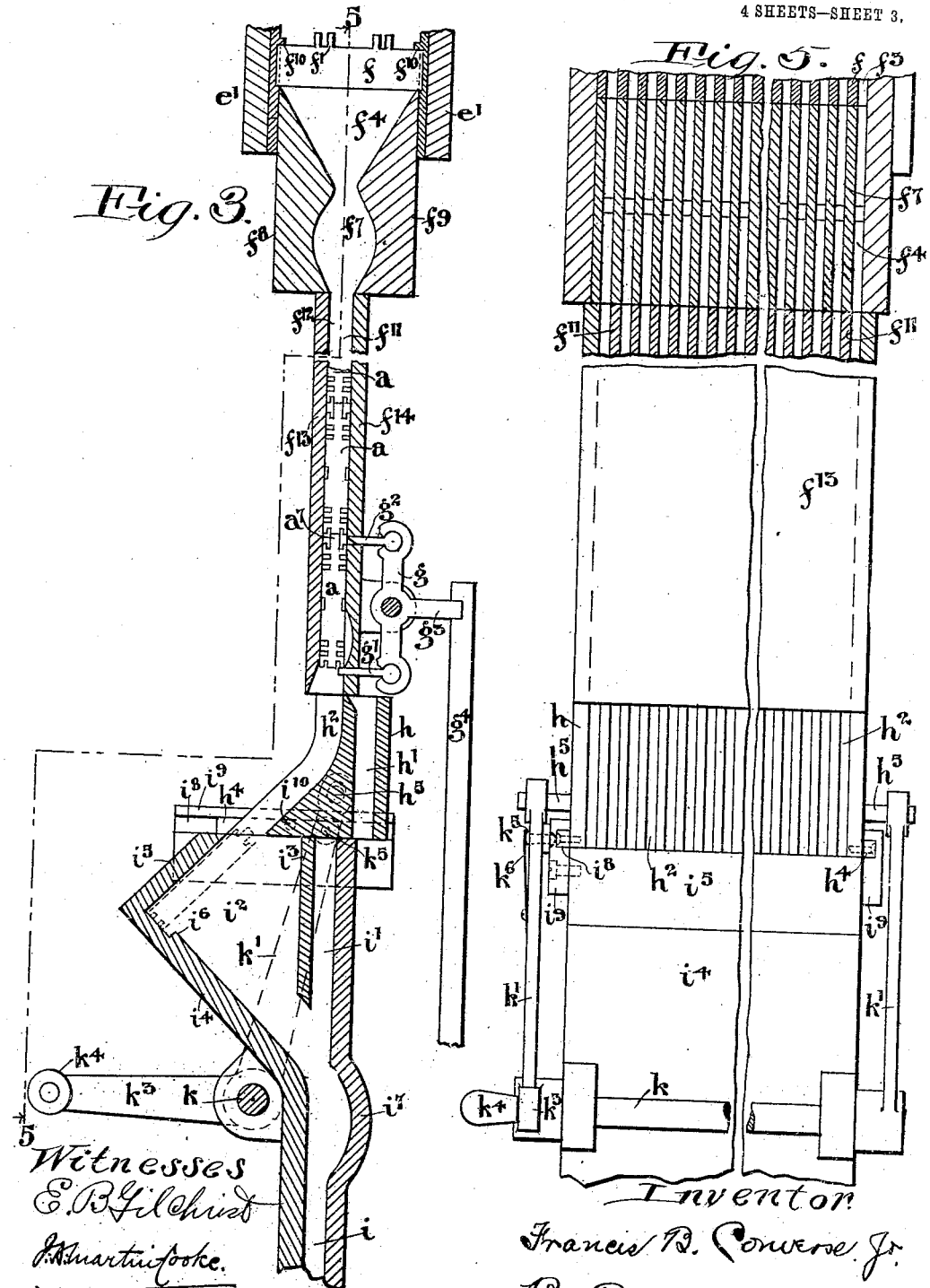

No. 890,266. PATENTED JUNE 9, 1908.
F. B. CONVERSE, Jr.
MATRIX ASSEMBLING AND DISTRIBUTING MACHINE.
APPLICATION FILED SEPT. 17, 1906.

4 SHEETS—SHEET 4.

Witnesses
E. B. Gilchrist
J. Martin Cooke
Brennan & West.

Inventor
Francis B. Converse Jr.
By his Attorneys
Bates, Fouts & Hull

UNITED STATES PATENT OFFICE.

FRANCIS B. CONVERSE, JR., OF NEW HAVEN, CONNECTICUT, ASSIGNOR, BY MESNE ASSIGNMENTS, TO MERGENTHALER LINOTYPE COMPANY, A CORPORATION OF NEW YORK.

MATRIX ASSEMBLING AND DISTRIBUTING MACHINE.

No. 890,266.　　　　　　　Specification of Letters Patent.　　　　Patented June 9, 1908.

Application filed September 17, 1906. Serial No. 334,850.

*To all whom it may concern:*

Be it known that I, FRANCIS B. CONVERSE, Jr., residing at New Haven, in the county of New Haven and State of Connecticut, have invented a certain new and useful Improvement in Matrix Assembling and Distributing Machines, of which the following is a full, clear, and exact description, reference being had to the accompanying drawings.

This invention has for its object the production of a rapid and efficient mechanism for conveniently discharging matrices from a classified supply contained in a magazine; for assembling them in a line, and for distributing the matrices after use, into the magazine. The mechanism is adapted to use matrices each having two characters, one in each of two opposite faces; to assemble them with either character in operative position, as desired, inverting them when necessary to bring the required characters into position; and to return the matrices to the channels of the magazine, all in the same relative position, to be used again.

The mechanism is adapted for use in any form of machine that assembles matrices or dies from a supply in the magazine, and which after use (either as a mold from which a cast is made or as dies to impress a matrix, or otherwise) returns the matrices to the channels of the magazine.

The distributing mechanism is operative in connection with matrices having a single character, as well as with those having two characters.

General Description.

In general, the invention provides elongated matrices having two characters (either different characters or variant forms or "faces" of the same character) one in each of two opposite longitudinal edges; means for releasing the matrices from the magazine in which they are stored end to end in upright columns; a shiftable gate by means of which the matrices are conducted to the assemblage point either directly or turned end for end to bring either character into operative position. With this is combined means for distributing the matrices, after use, into the proper channels of the magazine, depositing them therein, all in the same relative position, ready to be used again. To this end means are provided for removing the matrices singly from the end of the line to be distributed, and for inserting them in horizontal positions into the cells of a moving conveyer. This conveyer advances the matrices sidewise, their nicked edges being downward; and passes them over a succession of selector-plates, each of which is provided with upwardly extending projections or wards corresponding with the nicks of the respective matrices.

An open-end receiving channel is formed between each two selector-plates; and the selector-plate immediately preceding each channel has wards corresponding to the nicks of the matrix belonging in that channel. The matrix while passing over the face of a selector-plate rests upon the ends of the wards of that plate. If the wards of the plate and the nicks of the matrix do not correspond, as the matrix passes off that plate notches in its vertical ends engage fixed horizontal tongues projecting into their path, which sustain the matrix while it is passing over the open end of the receiving channel. The matrix thus passes over successive selector-plates and channels until it reaches a selector-plate having wards corresponding to its nicks, whereupon the matrix drops upon the top of that plate a distance equal to the height of the wards, thereby bringing its notches and the upper edge of the matrix below the line of the sustaining tongues.

The above described operation leaves the matrix free to drop into the adjacent channel as it comes over that channel. One of two projecting ribs, one on each of the vertical end walls of the channel just below its entrance, stands in the path of a projection on one vertical end of the matrix in such manner as to support that end of the matrix while the other end falls to a nearly vertical position, whereupon the matrix descends endwise vertically into its channel. The matrices are all thus returned to their channels with the ends provided with the projections uppermost, irrespective of their previous position in the assembled line. Each channel is continued downward in the form of a narrow passageway, retaining the matrices end to end in a single column, from which the lowermost is adapted to be discharged in assembling.

The mechanism will now be specifically described, reference being had to the accompanying drawings.

Drawings.

Figures 7, 8:
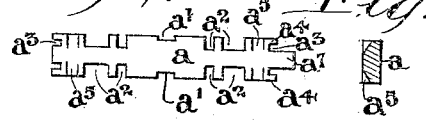
Figure 9:
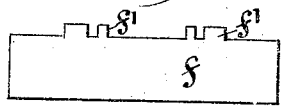
Figure 10:
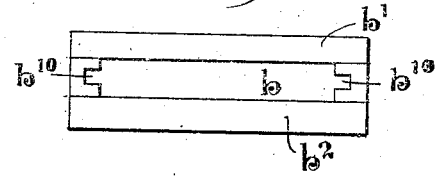

Figure 1 is a longitudinal vertical section, substantially on lines 1—1 of Figs. 2 and 4. Fig. 2 is a transverse vertical section, as on line 2—2 of Fig. 1 and 4. Fig. 3 is a lower construction of the mechanism sectioned on the same plane as Fig. 2. Fig. 4 is a sectional plan, being taken substantially on line 4—4 of Fig. 1. Fig. 5 is a sectional elevation, on the offset line 5—5 in Fig. 3, being in effect a lower continuation of the right hand portion of Fig. 1. Fig. 6 is a view representing assembled matrices, some of which have been inverted to present italic faces. Figs. 7 and 8 are an elevation and cross section, respectively, of a matrix. Fig. 9 is a detail showing a selector-plate. Fig. 10 is a left hand end view of the cut-off feed channel.

*Matrix.*—My matrix $a$ is shown in Figs. 7 and 8. It consists of a flat elongated rectangular plate of a thickness corresponding to the width of the character it bears. The character is punched or formed in its opposite edges as $a'$ $a'$. The two characters may be entirely dissimilar or one may be a variant form of the other, as the Roman and italic form of the same letter. Nicks $a^2$ in various selective combinations are also cut in the opposite edges. Notches $a^3$ in each end leave comparatively narrow projections $a^4$ between them and the edges. Beveled grooves $a^5$ are cut in the edges of the thicker matrices of such depth as to leave the thickness at the edge the same as the thickness of the thinnest matrix. The matrix has a projection $a^7$ at one end for a purpose to be hereinafter described.

*Distributing mechanism.*—It will be most convenient to consider first the distributing portion of the invention. A line of matrices $a$, lying horizontally on edge side by side and requiring to be distributed, is fed endwise into the horizontal channel $b$ (Figs. 1 and 10), between the plates $b'$ and $b^2$, supported by the downwardly extending portions $e'$, $e'$ of the vertical frame plates $e$, $e$. The matrices are retained in alinement, the end projections $a^7$ extending into the grooves $b^{10}$ in the side walls of the channel $b$. The matrix line is pressed by a spring-actuated follower $b^4$, of any desirable form, toward the plate $b^3$ at the right hand end of the channel $b$. A lifter plate $c$, of a width substantially equal to the length of a matrix, has an upper portion $c'$, (the thickness of which is slightly less than that of the thinnest matrix) extending into an opening between the bottom plate $b^2$ and the plate $b^3$, as shown in Fig. 1. This lifter plate is permitted vertical movement by the gibs $c^2$ which hold it in place upon the plate $b^3$. A double armed lever $c^3$ secured to the rock-shaft $c^5$ engages by its yoked ends the rod $c^6$ secured by the lug $c^7$ to the plate $c$. A spring $c^8$ secured to the frame and to the depending arm $c^9$ of the lever $c^3$ tends to raise the plate. Its action is controlled by a cam $c^{10}$ (on the shaft $e^2$) which acts through a roll $c^{11}$ on a link $c^{12}$ which is guided at its upper end by a stud $c^{13}$ which engages a slot in the link. The link is pivoted at its lower end to the short lever-arm $c^{14}$ secured to the rear end of the shaft $c^5$.

As the alternate depressions and projections of the cam $c^{10}$ pass the roll $c^{11}$, the lifter plate $c$ rises and falls, being lifted by the spring $c^9$ and depressed by the projections of the cam. As this plate rises it lifts with it the end matrix in the channel $b$, carrying it through the slot $c^{15}$ into one of the cells $d^3$ of a series of carriers $d$ directly above it. When the lifter descends, the pressure of the follower $b^4$ advances the remaining matrices to bring the next matrix into position to be transferred to the carrier by the next upward stroke of the lifter.

The slot $c^{15}$ must be wide enough to permit the passage of the thickest matrix. The passage of two thin ones together is prevented by plungers $b^5$ $b^5$, each of which consists of a round shank and the rectangular head $b^6$. The shanks are seated in sockets with springs $b^8$ $b^8$ pressing them outward. The heads $b^6$ $b^6$ project out nearly across the slot $c^{15}$, and the slots in which the heads are seated permit inward movement of the plungers against their springs. These plungers stand normally so that a thin matrix can pass them; but they prevent the passage of two at a time. The plungers are in line with the beveled notches $a^5$ $a^5$ of the matrices. As a thick matrix is lifted through the slot $c^{15}$, the beveled surface at these notches meet the head of the plungers, pressing them backward to permit the passage. The matrices are by these means transferred singly to the successive cells of the series of continually moving carriers $d$ before mentioned. Each of these carriers consists of a plate $d^1$, having on the underside the projecting ribs $d^2$ which form the cells $d^3$ between them. Rack-teeth $d^4$ are formed on the side opposite to the ribs, the pitch of these teeth being equal to the spacing of the ribs. The length of a carrier and the number of cells in each is a matter of convenience only. Enough of these carriers are provided to make an endless line of them around the elliptical path formed by the grooves $e^4$ $e^4$ in the frame plates $e$ $e$, in which pins $d^5$ $d^5$ projecting from each side of the carriers near their ends, engage to guide them.

A gear $e^3$ on the shaft $e^2$, which has bearings in the frame plates $e$, meshes with the rack teeth $d^4$ of the carrier directly beneath it. The shaft is driven in the direction indicated by the arrow in Fig. 1, by means of a suitable belt or gear connection, (not shown), with the power shaft of the complete machine, of which this mechanism is intended to form a part. In thus rotating, the gear $e^3$ advances the carrier engaged by it, and with it all the rest of the carriers in the elliptical path. The carrier following the engaged carrier is brought into engagement with the gear as the preceding carrier passes out of such engagement, thus maintaining continuous advancement of the carriers toward the right of Fig. 1.

The pitch of the rack teeth on the carriers being equal to the spacing of the cells, and there being as many projections on the cam $c^{10}$ as there are teeth on the gear $e^3$, it follows that the lifter $c$ is reciprocated once during the passage of each cell of the carriers over the slot $c^{15}$, to deliver a matrix to each cell.

The matrices received in the cells of these carriers are advanced by them over the upper faces of the selector-plates $f$. There are as many of these plates as there are characters to be distributed. They consist each of a flat piece of metal having the upwardly extending wards $f^1$, and are held in place by being mortised in the plates $f^2 f^2$, at each end. An opening $f^3$ substantially wider than the matrix corresponding to each selector plate is left between such plate and the next one to the right thereof. These openings $f^3$ form upper extensions of channels $f^4$ into which the matrices when released may fall. The channels $f^4$ are made by the partition plates $f^7$ in line with the selector plates, and the front and back plates $f^8$ and $f^9$, which extend across these partitions.

The matrices are adapted to be carried across the open end of the receiving channels $f^3$ by the sections of an interrupted tongue $f^5$ on the inner side of each of the plates $f^2$. These tongues bridge the channels only, being cut away directly above the selector-plates, as shown in Figs. 1 and 4. They are so positioned that the notches $a^3$ in each end of the matrix pass over them as the matrix passes off the selector-plates. These tongues therefore support the matrix at its opposite vertical ends as it is passing over the channels, but release it to permit it to be supported by the upper face of the wards as it is passing over the selectors.

The flanges which carry the horizontal tongues $f^5$, are each provided with a smooth continuous face $f^6$. These faces bear against the ends of the matrices and insure their proper presentation to the selectors, but there is sufficient clearance between the parts to permit the matrices to fall freely when released.

Each matrix being advanced horizontally sidewise, is supported alternately by the selector-plates $f$ below and the tongues $f^5$ at its ends, until it reaches a selector-plate the wards of which correspond to the nicks on the lower edge of the matrix. Thereupon the matrix drops down on the selector plate a distance equal to the height of the wards. This brings upper edge of the matrix below the line of the tongues $f^5$. As the matrix is then advanced from its supporting selector-plate, it falls into the receiving channel $f^4$.

Seven positions of nicks furnish an ample number of combinations for fonts of the usual size. The same combination of nicks is used in the two halves of each matrix, so that the matrix is always supported on both sides of the middle in passing over the successive selectors until it is released by its own selector. The nicks may be wide or narrow as illustrated in the different views of matrices shown, from a width including all the seven different positions to a width of a single position.

As has been stated, the matrices are provided with two characters, of which one will usually be a variant form of the other, as Roman and italic. One edge of the matrix being used for the Roman and the opposite edge for the italic, the matrices may come to the distributing point with either edge uppermost, as illustrated in the assembled block of matrices in Fig. 6. To cause the matrices to assume the same position in their channels, whichever way they are presented to the selecting mechanism, I provide at one end of the matrix the extension $a^7$. Extending over the selector-plates $f$, near their ends, are the ribs $f^{10}$, which are formed on the inner faces of the plates $f^2$. These ribs project far enough into the channel mounts so that one or the other rib is underneath the projection $a^7$ of a matrix in the channel mouth, and the opposite rib clears the other end of the matrix. The result of this is that as the matrix drops into the channel, the tongue $a^7$ strikes one or the other of the ribs $f^{10}$, which forms a fulcrum about which the matrix swings downward. Therefore the matrix always passes into the channel with the end having the projection uppermost.

The channels $f^4$ are continued downwardly in the form of narrow passageways $f^{11}$ which are adapted to hold the matrices in a single column, end to end, as shown in Fig. 3, the passageways being provided by partition plates $f^{12}$ between the front and back plates $f^{13}$ and $f^{14}$. The group of these passageways forms the magazine in which the matrices are stored, the bottom matrix in each passageway resting on an escapement device, which constitutes the discharge mechanism, which will now be described.

*Assemblage mechanism.*—The magazine, composed of the individual channels $f^{11}$, is of such length as to contain a considerable number of matrices, standing on end, one above the other. The lowermost matrix rests on the escapement pawl $g^1$ pivotally c- ried at the lower end of a rocking lever $g$. This lever is pivoted at its mid point, and at its upper end pivotally carries another pawl $g^2$. The lever is provided with a third arm $g^3$ connected by a link $g^4$ with the corresponding finger key, not shown. When the finger key is actuated, the link is raised, withdrawing the pawl $g^1$ and projecting the pawl $g^2$ beneath the next to the bottom matrix. This allows the bottom matrix to drop by gravity. The return of the link $g^4$ projects the pawl $g^1$ into the path of the matrices and withdraws the pawl $g^2$, allowing all the matrices above it to drop onto the pawl $g^1$.

In assembling the matrices, they may be inverted whenever desired, to allow the use of the variant characters in the other edge of the matrix. This inverting mechanism comprises a gate $h$, which has channels $h^1$, each adapted to lead downward in substantially a continuation of a channel $f^{11}$, and has other channels $h^2$ which bend toward the horizontal at an angle of about 45°. Beneath the gate are the discharge channels $i$ which lead downward to the assemblage position. The upper portion $i^1$ of each channel $i$ is substantially in alinement with the corresponding channel $f^{11}$. If now the gate is in its forward position, the channels $h^1$ connect the channels $f^{11}$ directly with the channels $i^1$, and the released matrix drops straight down by gravity, foot end foremost, into the main discharge channels $i$ in its course to the assembling mechanism, by which the successive matrices will be assembled in a common line, as usual. Mechanisms suitable for the purpose are known in the art in various forms, and constitute no part of the present invention.

When it is desired to invert the matrices, the gate is shifted rearwardly into the position shown in Fig. 3, thus bringing the upper end of the channels $h^2$ into alinement with the lower end of the channels $f^{11}$. At the same time, the lower end of the channels $h^2$ register with laterally extending spaces $i^2$ provided on the forward side of the channel $i^1$, and separated therefrom by the partition $i^3$. The lateral extensions $i^2$ have bottom plates $i^4$ and top plates $i^5$ which are each at angles of about 45° to the horizontal. Thus the matrix sliding down a channel $h^2$ comes into the lateral space $i^2$ just behind the upper wall $i^5$. In this position the upper end of the matrix is unsupported, while the lower end is above a ledge $i^6$ provided by a groove cut in the upper face of the bottom wall $i^4$. The lower end of the matrix being thus supported, the upper end swings downward about this edge as a fulcrum, bringing the matrix onto the lower wall $i^4$. From this point it slides downward by gravity beneath the lower end of the partition $i^3$ into the channel $i$, this channel being bowed outwardly laterally on its rear face, as shown at $i^7$ to allow the matrix sliding down the wall $i^4$ to come into a vertical position in the channel $i$. Thus the matrix is caused to turn a somersault during its passage from its magazine to the receiving channel.

It will be seen from the above that while the matrices all stand in their magazines with their foot end lowermost, they are adapted to be discharged into the channel $i$, either foot end or head end lowermost, as desired, the same being controlled simply by shifting the gate $h$.

The gate $h$ is slidably carried between the magazine and the receiving channels by means of gibs $h^4$ on the opposite end of the gate which take into grooves $i^8$ in blocks $i^9$ secured to the opposite ends of the group of receiving channels.

To shift the gate, I provide a rock shaft $k$ which has at its opposite ends, a pair of rigid arms $k^1$, the upper ends of which have slots which receive pins $h^5$ extending from the ends of the gate. The rock shaft $k$ is provided with an operating arm $k^3$ having a handle $k^4$. A suitable pin $k^5$, loosely mounted in one of the arms $k^1$, is pressed inward by a spring $k^6$, seating in either of two depressions $i^{10}$ in the block $i^9$ at each end of the stroke of the lever $k^1$, to maintain the gate $h$ yieldingly in position, but allowing it to be shifted very easily whenever desired.

It results from the mechanism described that the simple touch of the operator's hand on the handle $k^4$, giving it a slight movement up or down, may change the characters of the matrices being assembled from Roman to italic, or whatever change is provided on the matrices. This operation is so simple that, when desired, a change can be made without substantial delay for a single word or letter in a line, as illustrated in Fig. 6.

I believe it to be wholly new in distributing mechanisms to combine with a set of matrices which are non-symmetrical in form, that is to say, of different forms at opposite ends or sides, means for directing these matrices through a common path, and means in said path to cause the passing matrices to rotate by gravity to the right or the left as they continue their course.

I also believe it to be wholly new in distributing mechanisms to combine with a series of matrices and means for delivering them successively through a common path, adjustable or variable means whereby the gravitating matrices may be caused to turn edgewise in a definite manner as they continue in their course.

I also believe it to be wholly new in distributing mechanisms to combine with a series of matrices and means for directing them one after another in a common path, controllable means causing the matrices to pursue their course without turning, or to effect a definite turning movement at will.

I also believe it to be wholly new in distributing mechanisms to combine with a series of matrices and means for directing them successively in a common path, fixed means to engage the traveling matrices at one end, and movable means for directing the matrices at will into engagement with the fixed means, whereby the rotation of the advancing matrices may be effected.

I also believe it to be wholly new in distributing mechanisms to combine with means for directing matrices one after another in a straight path, means which may be interposed in said path at will to effect a definite turning motion of the matrices as they proceed.

I also believe it to be wholly new in the art to combine with matrices having characters in different faces, a distributing mechanism whereby the matrices standing with either end upward will all be delivered with like ends upward.

Having thus described my invention, I claim:

1. The combination with matrices having characters in opposite edges, of a magazine adapted to contain such matrices, mechanism for distributing the matrices into the magazine in a definite position, means for discharging a matrix therefrom, and controlled mechanism for turning it or not as desired.

2. The combination with a series of matrices, a magazine wherein the matrices are sustained one upon another end to end, means for discharging the matrices individually from the lower end of the magazine, and mechanism controllable by the operator for turning the discharged matrices through substantially 180 degrees when required; whereby the matrices may be delivered to the line either in the position which they occupy in the magazine, or in an inverted position, at will.

3. Matrices each having characters in opposite edges, in combination with a magazine wherein said matrices are stored on end in a column, means for releasing the matrices one at a time from the bottom of the column, and manually controllable mechanism for definitely turning the released matrices end for end; whereby matrices vertically arranged in the magazine may be caused to present one character or the other in line at the will of the operator.

4. The combination with matrices having characters in opposite faces, of a magazine adapted to contain such matrices end to end, means for discharging a matrix, and controlled mechanism adapted to turn the matrix through substantially 180 degrees to cause the matrix to stand other end up with reference to its position in the magazine after discharge.

5. The combination with matrices having characters in opposite faces, of a magazine adapted to contain such matrices on end one above the other in a column, means for releasing the bottom matrix, and controlled mechanism adapted to turn the matrix through substantially 180 degrees to cause the matrix to stand other end up with reference to its position in the magazine after release.

6. The combination of a magazine adapted to carry matrices, mechanism for distributing the matrices to the magazine in a definite position, mechanism for discharging a matrix, and mechanism for turning it or not, as desired.

7. The combination with matrices having characters in opposite faces, of a magazine adapted to contain such matrices end to end, mechanism for distributing the matrices into the magazine with a definite end toward the discharge point, means for discharging the end matrix, and controlled mechanism adapted to turn the matrix end for end after discharge.

8. The combination with matrices having characters in opposite faces, of a magazine adapted to contain such matrices one above the other in a column, mechanism for distributing the matrices into the magazine with a definite edge lowermost, means for releasing the bottom matrix, and controlled mechanism adapted to turn the matrix after release.

9. The combination of a magazine channel adapted to contain a series of matrices, a receiving channel, and an intermediate shiftable gate adapted to guide the bottom matrix in a straight line from its magazine to the receiving channel or to invert it during such passage.

10. The combination of a magazine channel adapted to contain a series of matrices, automatic mechanism for distributing such matrices to the magazine in a definite position, a receiving channel, an intermediate shiftable gate adapted to guide the released matrix without inversion from the magazine to the receiving channel or to invert it during such passage, and means for shifting said gate.

11. The combination of a magazine comprising a series of upright channels side by side, each channel adapted to contain and guide a series of matrices end to end, means for releasing the bottom matrix to the action of gravity, a receiving channel, and an intermediate shiftable gate adapted to guide the bottom matrix without inversion from its magazine channel to the receiving channel, or to invert it during such passage.

12. The combination of a magazine having channels adapted to contain matrices in a column, mechanism for automatically distributing the matrices into their channels with a definite end toward the discharge point, means for discharging the matrices, and means for turning a matrix whenever desired.

13. The combination of a vertical magazine having channels adapted to contain matrices placed end to end, mechanism for automatically distributing the matrices into their channels with a definite end toward the discharge point, mechanism for discharging the bottom matrix singly, a receiving channel below the magazine, and intermediate guiding mechanism between the magazine and receiving channel to allow the matrix to pass directly from the magazine to the receiving channel or to turn it during the passage.

14. The combination of a magazine adapted to contain matrices in a column, means for discharging the matrices, and means movable into and out of the matrix path for somersaulting a matrix whenever desired.

15. The combination of a vertical magazine adapted to contain matrices placed end to end, means for discharging a matrix into a receiving channel with the same end uppermost which the matrix had in the magazine, and means for causing said matrix whenever desired to turn a somersault during such discharge.

16. The combination of a vertical magazine having channels adapted to contain matrices placed end to end, mechanism for automatically distributing the matrices into their channels with a definite end toward the discharge point, means for discharging a matrix into a receiving channel with the same end lowermost which the matrix had in the magazine, and means for causing said matrix whenever desired to turn a somersault during such discharge.

17. The combination of a vertical magazine adapted to contain matrices placed end to end, escapement mechanism for discharging the bottom matrix singly, a receiving channel below the magazine, and intermediate guiding mechanism between the magazine and receiving channel to allow the matrix to pass directly from the magazine to the receiving channel or to somersault it during the passage.

18. The combination of a magazine adapted to contain matrices placed end to end, means for discharging the end matrix, a receiving channel, intermediate guiding mechanism between the magazine and receiving channel to allow the matrix to pass directly from the magazine to the receiving channel or to somersault it during the passage, and hand-controlled mechanism for shifting the guiding mechanism.

19. The combination of a channel adapted to contain a series of matrices, a receiving channel having two passageways leading thereinto, a shiftable gate adapted when in one position to guide the matrix directly into one of said passageways, and when in another position to guide the matrix partially inverted into the other passageway, said last mentioned passageway having space to allow the matrix to turn head end downward.

20. The combination with a magazine channel, a receiving channel having a laterally offset portion near its upper end, an intermediate gate between the magazine channel and the receiving channel, said gate having a passageway adapted to direct the matrix diagonally into said offset, said offset being provided with a ledge adapted to engage the matrix near its foot and allow it to swing downward and pass head lowermost into the receiving channel.

21. The combination with a magazine channel, a receiving channel provided with a vertical passageway and a diagonal passageway, a gate between the magazine channel and the receiving channel, said gate having a vertical passageway adapted to connect the magazine and the receiving channel directly and having a bent passageway leading laterally at an angle and adapted to discharge the matrix into the diagonal passageway.

22. The combination with a magazine channel, a receiving channel provided with a vertical passageway and an offset passageway, a gate between the magazine channel and the receiving channel, said gate having a vertical passageway adapted to connect the magazine channel and the receiving channel and having another passageway leading laterally at an angle and adapted to discharge the matrix into the offset passageway, a ledge in said offset passageway about which the matrix may turn and pass diagonally downward, and mechanism for shifting said gate.

23. The combination with an upright magazine channel, a receiving channel dividing at its upper end and provided with a vertical passageway, and an enlarged passageway, a gate between the magazine channel and the receiving channel, said gate having passageways adapted to connect the magazine with either the vertical or diagonal passageway mentioned, a ledge in said diagonal passageway about which the matrix may turn and pass diagonally downward, and escapement mechanism for discharging the matrices one at a time.

24. The combination with matrices having characters in opposite edges, means for automatically distributing them into a magazine, and means for automatically controlling the direction which the matrix takes in the magazine.

25. The combination with matrices having characters in opposite edges, means for automatically distributing them into a magazine, means for automatically controlling the direction which the matrix takes in the magazine, means for releasing the matri and means for inverting it following the release.

26. The combination of a series of matrices having characters in their opposite edges and having selective nicks, means for automatically distributing the matrices according to the nicks, and means for causing the distributed matrices to enter their magazine with corresponding faces in the same direction, irrespective of the direction of such faces preceding distribution.

27. The combination with matrices having characters in their opposite edges, said characters in each matrix being variant forms of each other, said matrix having similar nickings in its opposite edges, selecting mechanism to cause the distribution of the matrices according to the nicks, and means on the matrices for controlling the direction the matrix assumes when distributed.

28. The combination of matrices having characters in opposite edges, a series of selectors, the selectors and matrices having corresponding wards and nicks, means for successively presenting the matrices to the selectors, each matrix having a feature on one end different from the other end, whereby the direction of distribution is controlled.

29. The combination of matrices having characters in opposite edges, said matrix having in its opposite edges the same system of nicks, and having at one end a projection different from the other end, a series of wards adapted to govern the distribution of the matrix similarly whichever edge is presented to the wards, and a pair of ledges, one or the other of which is adapted to be engaged by said projection to turn the matrix one way or the other when distributed.

30. The combination of means for automatically distributing matrices in a horizontal position, means for turning the matrices that they may proceed with one end foremost, and means adjustable at will to turn the matrices that they may proceed with the other end foremost.

31. The combination of means for automatically distributing matrices being advanced in a horizontal position, mechanism for turning the distributed matrices to cause them to pass downward with a definite end upward, and mechanism for inverting the distributed matrix when released.

32. The combination, with matrices nicked in opposite edges, of a series of alternately placed selectors and receiving channels, on the same side of the path of movement of the matrices, means for advancing the matrices across the selectors with either edge toward them, and means controlled by the selectors for determining whether the matrices pass into the receiving channels.

33. The combination of matrices, a series of selectors and open-mouth channels alternately placed, means for advancing matrices across such selectors, and mouths, said matrices and selectors having selective nicks and wards, notches in the ends of the matrices, and tongues at the channel mouths adapted to enter said notches.

34. The combination, with matrices, of a series of channels having horizontal open mouths, a series of horizontal selector plates placed between the mouths, means for advancing matrices in a horizontal plane across the selectors and mouths, tongues at the opposite ends of the mouths to prevent the matrices normally dropping thereinto, the matrices and selectors having corresponding nicks and wards whereby the matrices may drop onto the selectors and be advanced to pass beneath the tongues whereby they may drop into such mouths.

35. The combination of a series of carriers adapted to move through a given path, means for inserting matrices into said carriers, a series of open-mouth channels adjacent to the path of the matrices, a series of selectors consisting of wards corresponding to the nicks of the matrices formed between the mouths of said channels, and stationary means coöperating with the matrices for preventing them passing into a channel when the wards and nicks do not correspond.

36. The combination of a series of carriers, means for advancing the same in an orbital path having a straight portion, a series of channels placed at such straight portion, a series of selectors consisting of wards formed on the walls of the channels, whereby matrices in the carriers are advanced across the selectors and channels, stationary means coöperating with the opposite ends of the matrices adapted to prevent them from passing into improper channels while allowing them to pass into proper channels.

37. The combination of a series of carriers, means for continually advancing them in an orbital path including a horizontal plane in which the carriers open downwardly, mechanism for loading the carriers on their undersides, a series of alternately placed horizontal selectors and channel mouths across which the carriers travel, and means obstructing the mouths of the channels, and adapted to be avoided by the matrices when their nicks fit the adjacent selectors.

38. The combination of a series of movable carriers having cells in which matrices may be inserted, means for shoving the matrices from a line thereof successively into said cells, alternately placed selectors and channel mouths, means for advancing carriers across the same, stationary means engaging opposite ends of the matrices, for preventing the matrices passing into improper channels, said selectors and matrices having wards and nicks adapted when in registration to allow the matrix to pass beyond the range of said preventing means.

39. The combination with matrices having nicking in opposite edges and notches in their ends, of a movable carrier having in its under side cells in which matrices may be inserted, means for shoving the matrices from a line thereof successively into said cells, alternately placed selectors and channel mouths, means for advancing the carrier across the same, tongues opposite the channel mouths and adapted to enter said notches for preventing the matrices passing into improper channels, said selectors having wards adapted when in registration with corresponding nicks to allow the matrix to pass beyond the range of said tongues.

40. The combination of continuously moving carriers, means for feeding the same with matrices, alternately placed selectors and channel mouths across which the matrices in the carriers pass, stationary means for engaging the opposite vertical ends of the matrices to prevent them passing into improper channels, said selectors allowing the matrices when in registration to move to a position where they may clear said preventing means and thereby pass into the corresponding channel during the continuous movement of the carriers.

41. The combination of a continuously moving carrier having cells, alternately placed selectors and channel mouths across which the matrices in the carrier pass, tongues adjacent to the channel mouths for engaging the matrices to prevent them passing into improper channels, said selectors allowing the matrices when in registration to move to a position where they may clear said tongues and thereby pass into the corresponding channel during the continuous movement of the carrier, and means for automatically feeding matrices into the cells of said carrier during its movement.

42. The combination of a matrix having characters in opposite edges, and having a feature at one end different from the other end, means for distributing the matrices, and means adapted to coöperate with said distinctive feature to determine the position of the distributed matrix in the magazine.

43. The combination, with distributing mechanism, of matrices having variant characters in two opposite edges, and similar distribution nicks in two opposite edges.

44. Matrices having distribution nicks in the edge and also notches in the ends, in combination with distributing mechanism coöperating with the nicks and notches alternately.

45. The combination, with distributing mechanism, of matrices having characters in two opposite edges, and a distinctive feature on one end of matrix different from the other end for the purpose specified.

46. The combination, with distributing mechanism, of matrices having characters in two opposite edges, and a projection on one end of the matrix different from the other end for the purpose specified.

47. The combination, with distributing mechanism, of matrices having characters in two opposite edges, distributing nicks in the same edges and a feature on one end of matrix different from other end.

48. The combination, with distributing mechanism, of an elongated matrix having the same combination of distributing nicks in both sides of the middle of one of its edges for the purpose specified.

49. The combination, with distributing mechanism, of matrices having distribution nicks in two opposite edges, and notches in the ends thereof, said notches being similarly located in reference to the nicked edges.

50. The combination, with distributing matrices, of matrices having two systems of distinguishing features, one for the selection of matrices and the other for the rejection of non-selected matrices.

51. The combination, with distributing mechanism, of matrices each having two characters and two systems of nicks and projections,—one system being for the selection of matrices, and the other for the rejection of non-selected matrices.

52. In a mechanism for distributing matrices, in combination with matrices provided with two systems of nicks, one system being made up of combinations different for each different character, and the other system being the same for all characters, receiving channels, and selective wards corresponding to the nicks of the respective matrices to cause the selection of corresponding matrices, and other wards to coöperate with the second system of nicks for causing the rejection of non-selected matrices, said wards being located similarly in reference to all receiving channels.

53. The combination of means for automatically distributing matrices, and means for automatically turning the matrices to bring definite ends in the same direction irrespective of their direction before distribution.

54. The combination, with matrices having characters in opposite faces, of a magazine adapted to contain such matrices end to end, mechanism for distributing the matrices into the magazine with a definite end toward the discharge point, means for discharging the matrix, and mechanism adapted to turn the matrix through substantially 180 degrees.

55. The combination, with matrices having characters in opposite edges, of a magazine adapted to contain such matrices, one above the other in a column, mechanism for distributing such matrices into the upper end of the magazine, means for releasing the bottom matrix in the magazine, and hand-controlled mechanism adapted to turn such released matrix through substantially 180 degrees.

56. The combination of a series of movable carriers having cells in which matrices may be inserted, means for shoving the matrices from a line thereof successively into said cells, alternately placed selectors and channel mouths, means for advancing carriers across the same, and means for obstructing the mouths of the channels and adapted to be avoided by the matrices when their nicks fit the adjacent selectors.

57. The combination with distributing mechanism of a matrix having two characters in opposite faces, said matrix being provided with a distinctive feature and the distributing mechanism arranged to coöperate with said feature, whereby the matrices may be distributed, always facing one way irrespective of the way they face in use.

58. The combination with matrices having characters in opposite faces of a magazine for containing such matrices, mechanism for receiving matrices facing in both directions, and distributing them facing in one direction only into the magazine, and means for assembling the matrices facing in either direction desired.

59. The combination with a matrix having characters in its opposite edges, a magazine adapted to contain such matrices, mechanism adapted to receive the matrices with correspondingly formed characters facing both ways, and to distribute such matrices into the magazine with the characters facing only one way, and means for assembling such matrices from the magazine with the correspondingly formed characters facing either direction as desired.

60. The combination, with matrices having characters in opposite faces, of assembling mechanism adapted to present either face of the matrix as desired, and distributing mechanism adapted to receive the matrix with either face presented to distribute always with one face presented.

61. In combination with a distributing mechanism, matrices each, having unlike characters in opposite edges, and like distributing notches in both edges.

In testimony whereof, I hereunto affix my signature in the presence of two witnesses.

FRANCIS B. CONVERSE, Jr.

Witnesses:
CHARLES RUFUS HARTE,
CLIFFORD H. BOOTH.